(12) United States Patent
Zhang et al.

(10) Patent No.: US 11,770,808 B2
(45) Date of Patent: *Sep. 26, 2023

(54) RESOURCE INDICATING METHOD, APPARATUS, ACCESS NETWORK DEVICE, TERMINAL AND SYSTEM

(71) Applicant: GUANGDONG OPPO MOBILE TELECOMMUNICATIONS CORP., LTD., Guangdong (CN)

(72) Inventors: Zhi Zhang, Guangdong (CN); Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 57 days.

This patent is subject to a terminal disclaimer.

(21) Appl. No.: 17/411,661

(22) Filed: Aug. 25, 2021

(65) Prior Publication Data
US 2021/0385799 A1    Dec. 9, 2021

Related U.S. Application Data

(63) Continuation of application No. 16/579,499, filed on Sep. 23, 2019, now Pat. No. 11,129,139, which is a
(Continued)

(51) Int. Cl.
*H04W 72/04* (2023.01)
*H04W 72/21* (2023.01)

(52) U.S. Cl.
CPC ........... *H04W 72/04* (2013.01); *H04W 72/21* (2023.01)

(58) Field of Classification Search
CPC . H04W 72/04; H04W 72/0446; H04W 72/21; H04L 5/0023; H04L 5/0053; H04L 5/0078; H04L 5/0044; H04B 7/0617
See application file for complete search history.

(56) References Cited

U.S. PATENT DOCUMENTS 11,284,401 B2 * 3/2022 Takeda ............... H04L 5/0053
11,323,218 B2 * 5/2022 Kwak ................ H04B 7/0626
(Continued)

FOREIGN PATENT DOCUMENTS

CN        104426507 A    3/2015
CN        104885377 A    9/2015
(Continued)

OTHER PUBLICATIONS

The Second Office Action of corresponding Singaporean application No. 11201908816V. dated Oct. 6, 2022.
(Continued)

*Primary Examiner* — Brian D Nguyen
(74) *Attorney, Agent, or Firm* — Ladas & Parry LLP

(57) ABSTRACT

Provided are a resource indicating method, an apparatus, an access network device, a terminal and a system, which relate to the field of communications. The method includes: an access network device sends configuration information to a terminal, where the configuration information includes time domain resource grouping information for indicating a time domain distribution of at least one group of time domain resource units: and the access network device sends resource indication information to the terminal, and the terminal determines a time domain resource unit used by the terminal according to the resource indication information and the time domain resource grouping information. Resources that are discontinuous in the time domain can be flexibly indicated, thereby achieving the effect of indicating resources that are discontinuous in the time domain.

13 Claims, 6 Drawing Sheets

Related U.S. Application Data continuation of application No. PCT/CN2017/078065, filed on Mar. 24, 2017.

(56) References Cited

U.S. PATENT DOCUMENTS

| | | | |
|---|---|---|---|
| 11,432,322 B2* | 8/2022 | Yan | H04W 74/0833 |
| 11,452,129 B2* | 9/2022 | Li | H04W 72/20 |
| 2010/0267341 A1 | 10/2010 | Bergel et al. | |
| 2015/0305027 A1 | 10/2015 | Liu | |
| 2019/0335475 A1 | 10/2019 | Liang et al. | |
| 2019/0357224 A1 | 11/2019 | Li et al. | |
| 2019/0364449 A1 | 11/2019 | Yang et al. | |
| 2020/0028655 A1 | 1/2020 | Kakishima et al. | |
| 2020/0037298 A1 | 1/2020 | Shi et al. | |
| 2020/0235885 A1 | 7/2020 | Su et al. | |
| 2020/0274597 A1* | 8/2020 | Chen | H04W 72/04 |
| 2022/0368579 A1* | 11/2022 | Xi | H04L 1/009 |
| 2022/0377675 A1* | 11/2022 | Dinan | H04J 11/00 |

FOREIGN PATENT DOCUMENTS

| | | |
|---|---|---|
| CN | 105830496 A | 8/2016 |
| CN | 106455040 A | 2/2017 |
| CN | 106507442 A | 3/2017 |
| EP | 3499983 A1 | 6/2019 |
| RU | 2553983 C2 | 6/2015 |
| WO | 2015147717 A1 | 10/2015 |
| WO | 2016201627 A1 | 12/2016 |
| WO | 2017044155 A1 | 3/2017 |

OTHER PUBLICATIONS

International Search Report (ISR) dated Dec. 14, 2017 for Application No. PCT/CN2017/078065.

Ericsson: "Summary of e-mail discussions on downlink control signaling", 3GPP Draft; R1-1612908 Summary of E-Mail Discussion on Downlink Control Signaling, 3rd Generation Partnership Project (3GPP), Mobile Competence Centre; 650, Route Des Lucioles; F-06921 Sophia-Antipolis, vol. RAN WG1, No. Reno, NV, USA; Nov. 14, 2016-Nov. 18, 2016 Nov. 13, 2016(Nov. 13, 2016), XP051190931.

Samsung, 3GPP TSG RAN WG1 #85 R1-164013; Framework for beamformed access, Nanjing, China, May 23-27, 2016.

Ericsson, 3GPP TSG-RAN WG1 #86 R1-167466; Key principles for beam management, Göteborg, Sweden, Aug. 22-26, 2016.

The first Office Action of corresponding Russian application No. 2019130879, dated Jun. 18, 2020.

The first Office Action of corresponding Canadian application No. 3057524, dated Nov. 9, 2020.

The first Office Action of corresponding Indian application No. 201917040302, dated Jan. 27, 2021.

The first Office Action of corresponding Singaporean application No. 11201908816V, dated Mar. 16, 2021.

The EESR of corresponding European application No. 1790221.5, dated Mar. 9, 2020.

The Non-final Office Action of corresponding American U.S. Appl. No. 16/579,499, dated Feb. 4, 2021.

The Notice of Allowance of corresponding American U.S. Appl. No. 16/579,499, dated May 19, 2021.

The Supplemental Notice of Allowance of corresponding American U.S. Appl. No. 16/579,499, dated Jun. 23, 2021.

The first Office Action of corresponding Australian application No. 2017405790, dated Nov. 30, 2021.

The first Office Action of corresponding European application No. 17902221.5, dated Dec. 9, 2021.

The first Office Action of corresponding Chinese application No. 201780088282.7, dated Apr. 21, 2023.

The first Office Action of corresponding Mexican application No. MX/a/2019/011232, dated Mar. 28, 2023.

* cited by examiner

RESOURCE INDICATING METHOD, APPARATUS, ACCESS NETWORK DEVICE, TERMINAL AND SYSTEM

CROSS-REFERENCE TO RELATED APPLICATIONS

The present application is a continuation U.S. application Ser. No. 16/579,499, now U.S. Pat. No. 11,129,139, filed on Sep. 23, 2019. The U.S. application Ser. No. 16/579,499 is a continuation of International Application No. PCT/CN2017/078065 filed on Mar. 24, 2017. The disclosures of the aforementioned applications are hereby incorporated by reference in their entireties.

TECHNICAL FIELD

Embodiments of the present disclosure relate to the field of communications and, in particular, to a resource indicating method, an apparatus, an access network device, a terminal and a system.

BACKGROUND

The 5th generation mobile communication (5G) system is also known as a new radio (NR) system.

The 5G system is designed to include high bandwidth communications in high hand (for example, bands above 6 GHz). When the operating frequency becomes higher, the path loss during transmission increases, thereby affecting the coverage capability of a high frequency system. In order to ensure the coverage of the high band system, a narrower beam is formed by antenna array shaping to cover a smaller area in the 5G system, and at different times, there are different beams or groups of beams to cover the respective smaller areas, Therefore, through sweeping over time, the narrow beam can cover the entire cell in a time division multiplexing manner in one tune period.

According to the coverage principle of the above 5G multi-beam system, at a certain time, a narrow beam or a group of narrow beams formed by the system covers only a specific area. Therefore, only when covered by a certain narrow beam signal or a certain group of narrow beam signals, a terminal can have a chance to use system resources. That is, in the 5G multi-beam system, the resources schedulable by the terminal are discontinuous in the time domain. In the related art, the method for indicating the resource for the terminal by the system is based on continuous resources in the time domain, but cannot achieve the indication of the resources that are discontinuous in the time domain.

SUMMARY

In order to solve the technical problem that the method for indicating the resource for the terminal in the related art cannot achieve the indication of the resources that are discontinuous in the time domain, embodiments of the present disclosure provide a resource indicating method, an apparatus, an access network device, a terminal and a system. The technical solutions are as follows.

According to a first aspect of the embodiments of the present disclosure, a resource indicating method is provided, where the method includes:

sending, by an access network device, configuration information to a terminal, where the configuration information includes time domain resource grouping information for indicating a time domain distribution of at least one group of time domain resource units; and sending, by the access network device, resource indication information to the terminal, where the resource indication information is used for indicating that the terminal determines a time domain resource unit used by the terminal according to the time domain resource grouping information.

In an implementation, the configuration information includes first time domain resource grouping information; where the first time domain resource grouping information is used for indicating a time domain distribution of at least one group of assigned time domain resource units, and each group of the assigned time domain resource units is associated with one assigned type of signal;

or, the configuration information includes first time domain resource grouping information and second time domain resource grouping information; where the first time domain resource grouping information is used for indicating a time domain distribution of at least one group of assigned time domain resource units, and each group of the assigned time domain resource units corresponds to an assigned type of signal; and the second time domain resource grouping information indicates a time domain distribution of at least one group of common time domain resource units.

In an implementation, the sending, by an access network device, configuration information to a terminal includes:

sending, by the access network device, the configuration information to the terminal through a first control message, when the configuration information corresponds to a first type of resource;

where the first type of resource is a resource used for downlink data transmission, a resource used for uplink data transmission, a resource used for feeding back an acknowledgement/negative-acknowledgment message in a hybrid automatic repeat request (HARQ) process, a resource used for transmitting a physical uplink control channel (PUCCH), and a resource used for non-contention access; and the first control message is at least one of a physical broadcast channel (PBCH), system information (SI), radio resource control (RRC) signaling, or a media access control element (MAC CE).

In an implementation, the sending, by an access network device, configuration information to a terminal includes:

sending, by the access network device, the configuration information to the terminal through a second control message, when the configuration information corresponds to a resource used for contention access;

where the second control message is at least one of a PBCH or SI.

In an implementation, the configuration information further includes a correspondence between the time domain distribution of the at least one group of assigned time domain resource units and the assigned type of signal.

In an implementation, the method further includes:

sending, by the access network device, a correspondence between the time domain distribution of the at least one group of assigned time domain resource units and the assigned type of signal.

In an implementation, the assigned type of signal all or part of signals in a synchronization signal block (SS block).

In an implementation, the method further includes:

sending, by the access network device, an activation indication to the terminal, where the activation indication is used for indicating that the terminal determines the time domain resource unit used by the terminal according to a time domain distribution of a group of assigned time domain resource units in the first time domain resource grouping information.

In an implementation, the sending, by the access network device, the activation indication to the terminal includes:

sending, by the access network device, the activation indication to terminal through a third control message;

where the third control message includes at least one of RRC signaling, a MAC CE, or downlink control information (DCI).

In an implementation, the method further includes:

sending, by the access n work device, a grouping selection indication to the terminal;

where the grouping selection indication is used for indicating that the terminal determines the time domain resource unit used by the terminal according to a time domain distribution of a group of assigned time domain resource units in the first time domain resource grouping information and/or according to the second time domain resource grouping information.

In an implementation, the sending, by the access network device, a grouping selection indication to the terminal includes:

sending, by the access network device, the grouping selection indication to the terminal through DCI.

In an implementation, the sending, by the access network device, resource indication information to the terminal includes:

sending, by the access network device, the resource indication information to the terminal through DCI, when the resource indication information is used for indicating a second type of resource; where the second type of resource is a resource used for downlink data transmission, a resource used for uplink data transmission, a resource used for feeding back an acknowledgement/negative-acknowledgment message in a hybrid automatic repeat request (HARQ) process, or a resource used for transmitting a physical uplink control channel (PUCCH);

sending, by the access network device, the resource indication information to the terminal through a PBCH and/or SI, when the resource indication information is used for indicating a resource used for contention access; and sending, the access network device, the resource indication information to the terminal through RRC signaling and/or a MAC CE, when the resource indication information is used for indicating a resource used for non-contention access.

In an implementation, the resource indication information includes a timing offset, where the timing offset is used for indicating an offset between the time domain resource unit used by the terminal and a current time domain resource unit in a time domain;

or, the resource indication information does not include as timing offset, where the timing offset is used for indicating an offset between the time domain resource unit used by the terminal and a current time domain resource unit in a time domain.

In an implementation, the resource indication information indicates that the terminal determines an Nth time domain resource unit after the current time domain unit in a currently used time domain distribution of time domain resource units as the time domain resource unit used by the terminal, when the resource indication information includes the timing offset; where N is the timing offset, and N is an integer; and the resource indication information indicates that the terminal determines an Mth time domain resource unit after the current time domain unit in the currently used time domain distribution of time domain resource units as the time domain resource unit used by the terminal, when the resource indication information does not include the timing offset, where M is an integer obtained according to presetting and/or a network configuration;

where the currently used time domain distribution of time domain resource units is a time domain distribution of one or more groups of time domain resource units determined by the terminal from the time domain distribution of the at least one group of time domain resource units.

In an implementation, the time domain distribution of each group of time domain resource units in the time domain resource grouping information is a time domain distribution of an uplink time domain resource unit or a downlink time domain resource unit;

or, the time domain distribution of each group of time domain resource units in the time domain resource grouping information is a time domain distribution of an uplink time domain resource unit and a downlink time domain resource unit.

According to a second aspect of the embodiments of the present disclosure, a resource indicating method is provided, where the method includes:

receiving, by a terminal, configuration information sent by an access network device, where the configuration information includes time domain resource grouping information for indicating a time domain distribution of at least one group of time domain resource units;

receiving, lay the terminal, resource indication information sent by the access network device; and determining, by the terminal, a time domain resource unit used by the terminal according to the time domain resource grouping information.

In an implementation, the configuration information includes first time domain resource grouping information; where the first time domain resource grouping information is used for indicating a time domain distribution of at least one group of assigned time domain resource units, and each group of the assigned time domain resource units is associated with one assigned type of signal;

or, the configuration information includes first time domain resource grouping information and second time domain resource grouping information; where the first time domain resource grouping information is used for indicating a time domain distribution of at least one group of assigned time domain resource units, and each group of the assigned time domain resource units corresponds to one assigned type of signal; and the second time domain resource grouping information indicates a time domain distribution of at least one group of common time domain resource units.

In an implementation, the configuration information further includes a correspondence between the time domain distribution of the at least one group of assigned time domain resource units and the assigned type of signal.

In an implementation, the method further includes:

receiving, by the terminal, a correspondence between the time domain distribution of the at least one group of assigned time domain resource units and the assigned type of signal sent by the access network device.

In an implementation, the method further includes:

determining, by the terminal, a time domain distribution of one or more groups of assigned time domain resource units corresponding to an assigned type of signal, which is currently detected, as a currently used time domain distribution of time domain resource units.

In an implementation, the method further includes:

receiving, by the terminal, an activation indication sent by the access network device; and determining, by the terminal and according to the activation indication, a time domain distribution of one or more groups of assigned time domain resource units in the first time domain resource grouping information as a currently used time domain distribution of time domain resource units.

In an implementation, the method further includes:

receiving, by the terminal, a grouping selection indication sent by the access network device;

determining, by the terminal and according to the grouping selection indication, a time domain distribution of one or more groups of assigned time domain resource units in the first time domain resource grouping information, or the time domain distribution of the at least one group of common time domain resource units, or a combination of a time domain distribution of one or more groups of assigned time domain resource units in the first time domain resource grouping information and the time domain distribution of the at least one group of common time domain resource units, as a currently used time domain distribution of time domain resource units.

In an implementation, the resource indication information includes a timing offset, where the timing offset is used for indicating an offset between the time domain resource unit used by the terminal and a current time domain resource unit in a time domain; and the determining, by the terminal, a time domain resource unit used by the terminal according to the time domain resource grouping information includes:

determining, by the terminal, an Nth time domain resource unit after the current time domain unit in the currently used time domain distribution of time domain resource units as the time domain resource unit used by the terminal;

where N is the timing offset, and N is an integer.

In an implementation, the determining, by the terminal, the Nth time domain resource unit after the current time domain unit in the currently used time domain distribution of time domain resource units as the time domain resource unit used by the terminal includes:

determining, by the terminal, an Nth available time domain resource unit after the current time domain unit in the currently used time domain distribution of time domain resource units as the time domain resource unit used by the terminal.

In an implementation, the determining, by the terminal, an Nth time domain resource unit after the current time domain unit in the currently used time domain distribution of time domain resource units as the time domain resource unit used by the terminal includes:

determining, by the terminal, an Nth uplink time domain resource unit after the current time domain unit in the currently used time domain distribution of time domain resource units as the time domain resource unit used by the terminal, when the time domain resource unit used by the terminal is an uplink time domain resource unit; and determining, by the terminal, an Nth downlink time domain resource unit after the current time domain unit in the currently used time domain distribution of time domain resource units as the time domain resource unit used by the terminal, when the time domain resource unit used by the terminal is a downlink time domain resource unit.

In an implementation, the resource indication information does not include a timing offset, where the timing offset is used for indicating an offset between the time domain resource unit used by the terminal and a current time domain resource unit in a time domain; and the determining, by the terminal, a time domain resource unit used by the terminal according to the time domain resource grouping information includes:

determining, terminal, an Mth time domain resource unit after the current time domain unit in the currently used time domain distribution of time domain resource units as the time domain resource unit used by the terminal, where M is an integer obtained by presetting and/or a network configuration.

According to a third aspect of the embodiments of the present disclosure, a resource indicating apparatus is provided, where the resource indicating apparatus includes at least one unit, and the at least one unit is configured to implement the resource indicating method provided by the foregoing, first aspect or any one of the implementations of the first aspect; or the at least one unit is configured to implement the resource indicating method provided by the foregoing second aspect or any one of the implementations of the second aspect.

According to a fourth aspect of the embodiments of the present disclosure, an access network device is provided, where the access network device includes a processor, a memory and a transceiver; where the processor is configured to store one or more instructions, the instructions are instructed to be executed by the processor, and the processor is configured to control the transceiver to implement the resource indicating method provided by the foregoing first aspect or any one of the implementations of the first aspect.

According to a fifth aspect of the embodiments of the present disclosure, a terminal is provided, where the terminal includes a processor, a memory and a transceiver; where the processor is configured to store one or more instructions, the instructions are instructed to be executed by the processor, and the processor is configured to control the transceiver to implement the resource indicating method provided by the foregoing second aspect or any one of the implementations of the second aspect.

According to a sixth aspect of the embodiments oldie present disclosure, a computer readable medium is provided, where the computer readable medium stores one or more instructions for implementing the resource indicating method provided by the foregoing first aspect or any one of the implementations of the first aspect: or the computer readable medium stores one or more instructions for implementing the resource indicating method provided by the foregoing second aspect or any one of the implementations of the second aspect.

According to a seventh aspect of the embodiments of the present disclosure, a resource indicating system is provided, where the resource indicating system can include a terminal and an access network device. Where the access network device can be the access network device provided by the foregoing fourth aspect, and the terminal can be the terminal provided by the foregoing all aspect.

The beneficial effects of the technical solutions provided by the embodiments of the present disclosure are:

an access network device sends configuration information to a terminal, where the configuration information includes tune domain resource grouping information for indicating a time domain distribution of at least one group of time domain resource units; and the access network device sends resource indication information to the terminal, and the terminal determines a time domain resource unit used by the terminal according to the resource indication information and the time domain resource grouping information, thus resources that are discontinuous in the time domain can be flexibly indicated, thereby achieving the effect of indicating resources that are discontinuous in the rime domain.

BRIEF DESCRIPTION OF DRAWINGS

In order to more clearly illustrate the technical solutions in embodiments of the present disclosure, the drawings used in the embodiments will be briefly described below. Obviously, the drawings in the following description are merely some embodiments of the present disclosure. For those skilled in the art, other drawings can also be obtained based an these drawings without any creative effort.

DESCRIPTION OF EMBODIMENTS

In order to make the purpose, technical solutions and advantages of the present disclosure clearer, the implementations of the present disclosure will be further described in detail below with reference to the accompanying drawings.

The "module" as referred to herein generally refers to a program or instructions stored in a memory that is capable of performing certain functions; and the "unit" as referred to herein generally refers to a functional structure that is logically divided, and the "unit" can be implemented by pure hardware or a combination of hardware and software.

The "more" as referred to herein means two or more. The "and/or" describes the association relationship of the associated objects, indicating that there may be three kinds of relationships, for example, A and/or B may indicate three cases including that A exists solely, A and B exist at the same time, and B exists solely. The character "/" generally indicates that the contextual objects have an "or" relationship.

Figure 1:
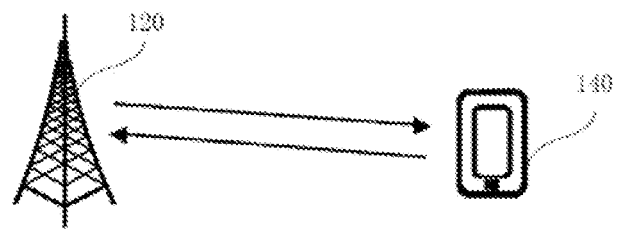
FIG. 1 is a schematic structural diagram of a mobile communication system according to an embodiment of the present disclosure.

Please refer to FIG. 1, which shows a schematic structural diagram of a mobile communication system according to an embodiment of the present disclosure. The mobile communication system can be a 5G system, which also known as an NR system. The mobile communication system includes an access network device 120 and a terminal 140.

The access network device 120 can be a base station. For example, the base station may be a base station (gNB) employing a centrally distributed architecture in the 5G system. When the access network device 120 adopts a centrally distributed architecture, it generally includes a central unit (CU) and at least two distributed units (DU). The central unit is provided with a protocol stack of a packet data convergence protocol (PDCP) layer, a radio link control (RLC) layer, and a media access control (MAC) layer; and the distributed unit is provided with a protocol stack of a physical (PHY) layer. The specific implementation of the access network device 120 is not limited in the embodiments of the present disclosure.

The access network device 120 and the terminal 140 establish a wireless connection through a wireless air interface. In an embodiment, the wireless air interface is a wireless air interface based on the fifth generation mobile communication network technology (5G) standard, for example, the wireless air interface is a new radio (NR); or the wireless air interface may also be a wireless air interface based on the next generation mobile communication network technology standard of 5G.

The terminal 140, which may also be referred to as a user equipment (UE), may be a device that provides voice and/or data connectivity to a user. The terminal can communicate with one or more core networks via a radio access network (RAN), and the terminal 140 can be a mobile terminal, such as a mobile phone (or a "cellular" phone) and a computer with a mobile terminal, for example, a portable, a pocket, a handheld, a computer built-in or an in-vehicle mobile apparatus. For example, a subscriber unit, a subscriber station, a mobile station, a mobile, a remote station, an access point, a remote terminal, an access terminal, a user terminal, a user agent, a user device, or a user equipment.

It should be noted that, in the mobile communication system shown in FIG. 1, multiple access network devices 120 and/or multiple terminals 140 may be included, and FIG. 1 shows one access network device 120 and one terminal 140 for illustration, but this embodiment does not limit to it.

Compared with the existing wireless communication system, such as a long term evolution (LTE) system, available scheduling resources for a terminal in the 5G may no longer be continuous in the time domain, but are discontinuous time domain resource units in the time domain.

Figure 2:
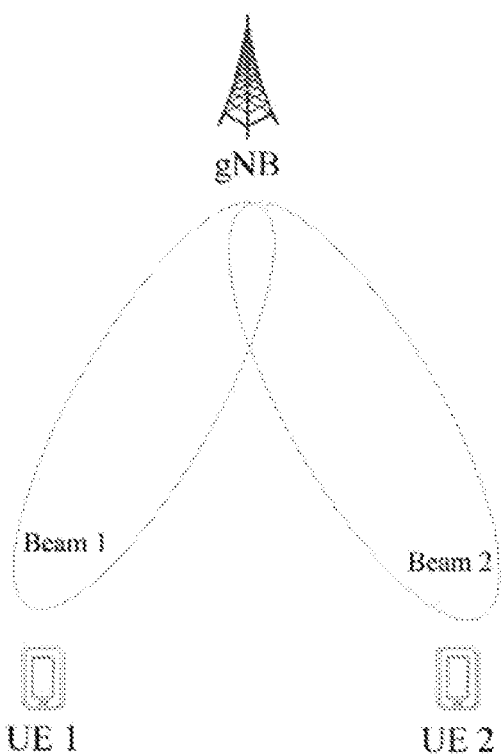
FIG. 2 is a schematic diagram of a correspondence between a beam and a terminal involved in an embodiment of the present disclosure.

For example, please refer to FIG. 2, which shows a schematic diagram of a correspondence between a beam and a terminal involved in an embodiment of the present disclosure. FIG. 2 shows a simple application scenario in which it is assumed that a system has two narrow beams, and the two beams cover two different sub-areas alternately in time. UE 1 and UE 2 in FIG. 2 are located in the two sub-areas, respectively, where a signal borne on beam 2 is propagated to UE 1 and the capability is lower than a certain threshold, then UE 1 cannot detect the signal corresponding to beam 2; accordingly, a signal borne on beam 1 is propagated to UE 2 and the capability is lower than a certain threshold, then UE 2 cannot detect the signal corresponding to beam 1.

Figure 3:
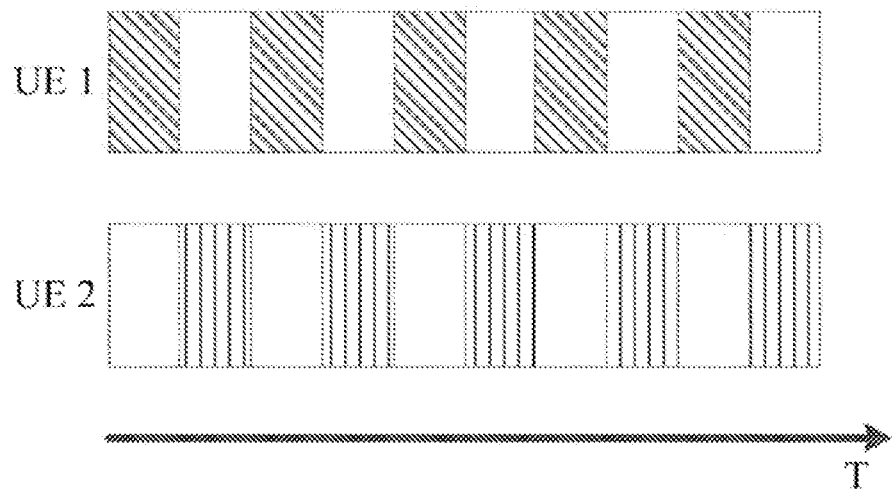
FIG. 3 is a schematic diagram of a time domain resource involved in an embodiment of the present disclosure.

Please refer to FIG. 3, which shows a schematic diagram of a time domain resource involved in an embodiment of the present disclosure. It is assumed that two beams in FIG. 2 cover respective sub-areas alternately at equal intervals. At this time, the available scheduling resources of UE 1 and UE 2 in the time domain are shown in FIG. 3. In FIG. 3, each rectangular box is a time domain resource unit; the upper half of FIG. 3 is a domain distribution of time resource units, corresponding to UE 1, where the time domain resource units filled with slashes are scheduling resources that are available for UE 1, and the time domain resource units without slashes are scheduling resources that are not available for UE 1; and the lower half of FIG. 3 is a time domain distribution of time domain resource units corresponding to UE 2, where the time domain resource units filled with vertical lines are scheduling resource that are available for UE 2, and the time domain resource units without: vertical lines are scheduling resources that are not available for UE 2.

It should be noted that, for a UE in FIG. 3, in the corresponding time domain distribution of time domain resource units thereof, the unfilled time domain resource units are not absolutely unavailable. For example, for the purpose of load balance, the system can divide partial time domain resource units in beam 2 into beam 1, and then in FIG. 3, partial time domain resource units available for UE 2 (i.e., partial time domain resource units filled with vertical lines in the lower half of FIG. 3) can be used by UE 1; on the contrary, if the system divides partial time domain resource units in beam 1 into beam 2, then in FIG. 3, partial time domain resource units available for UE 1 (i.e., partial time domain resource units filled with slashes in the upper half of FIG. 3) can be used by UE 2.

As can be seen from FIG. 3, in the 5G system, since the time domain resource units available for the terminal are discontinuous in the time domain, the distributions of the time domain resource units available for the terminal at different locations may be different in the time domain. Using the solution provided by the embodiments of the present disclosure, the time domain resource unit used by the terminal can be indicated in the case that the time domain resource units available for the terminal are discontinuous in the time domain. The time domain resource unit that can be indicated by the solution in the embodiments of the present disclosure includes but is not limited to the following;

1) a resource used for downlink data transmission;

2) a resource used for uplink data transmission;

3) a resource used for feeding back acknowledgment/ negative-acknowledgement (i.e., ACK/NACK) message during a hybrid automatic repeat request (HARQ) process (including uplink feedback and downlink feedback);

4) a resource used for transmitting a physical uplink control channel (PUCCH);

5) a resource used for transmitting a physical random access channel PRACH (including a contention access resource and a non-contention access resource).

Figure 4:
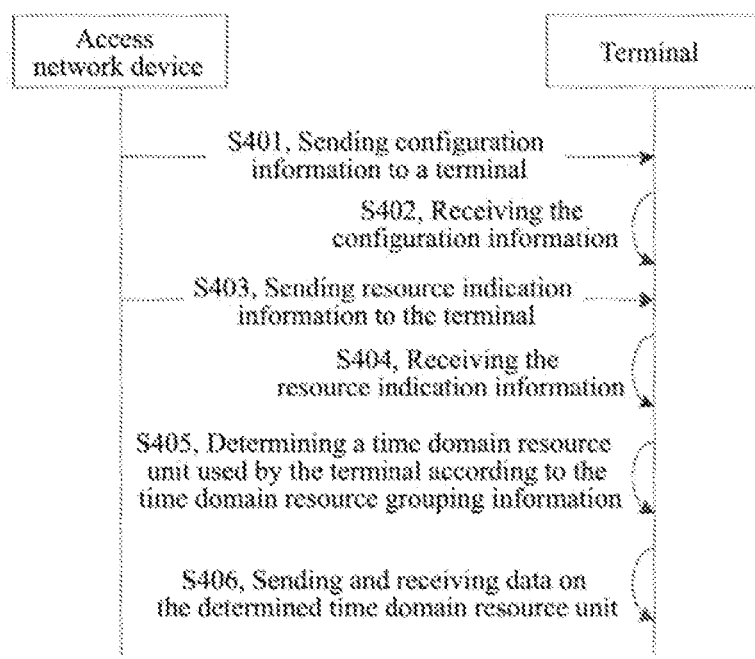
FIG. 4 is a flowchart of a resource indicating method according to an embodiment of the present disclosure.

Please refer to FIG. 4, which shows a flowchart of a resource indicating method according to an embodiment of the present disclosure. This embodiment is illustrated by taking that the resource indicating method is applied to the mobile communication system shown in FIG. 1 and indicates a time domain resource unit used by a terminal as an example. The method includes the following steps.

Step 401: an access network device sends configuration information to a terminal, where the configuration information includes time domain resource grouping information for indicating a time domain distribution of at least one group of time domain resource units.

In an embodiment, the configuration information includes first time domain resource grouping information where the first time domain resource grouping information is used for indicating a time domain distribution of at least one group of assumed time domain resource units, and each group of the assigned time domain resource units is associated with one assigned type of signal.

In a practical application, a beam is invisible to the terminal side, and the terminal usually distinguishes different beams according to an assigned type of signal carried in the beam. Specifically, the assigned type of signal may be all or part of signals of a synchronization signal block (SS block).

For convenience of description, in the embodiments of the present disclosure, the time domain distribution of a group of time domain resource units may be referred to as a group of time domain distribution Patterns. For at least one group of Patterns indicated by the first time domain resource grouping information, each group of Patterns may correspond to one assigned type of signal; taking the assigned type of signal being an SS block as an example, each group of Patterns indicated by the first time domain resource grouping information may indicate the distribution situation of resources in the time domain that are available for the terminal on a beam carrying an SS block.

It should be noted that, in the embodiments of the present disclosure, a time domain resource unit that is available for the terminal and is indicated by a group of Patterns refers to a time domain resource unit that can be used by the terminal by default without special indications, in the case of a special indication (such as a terminal indication), other time domain resource units except the time domain resource unit that is available for the terminal and is indicated by the group of Patterns may also be used by the terminal; or, in the case of a special indication (such as a terminal indication), a certain or some terminals may also be prohibited from using some time domain resource units in the available time domain resource units indicated by a group of Patterns.

In each group of Patterns, the indicated adjacent two time domain resource units available for the terminal may be continuous in the time domain, or the indicated adjacent two time domain resource units available for the terminal may also be discontinuous in the time domain.

Figure 5:
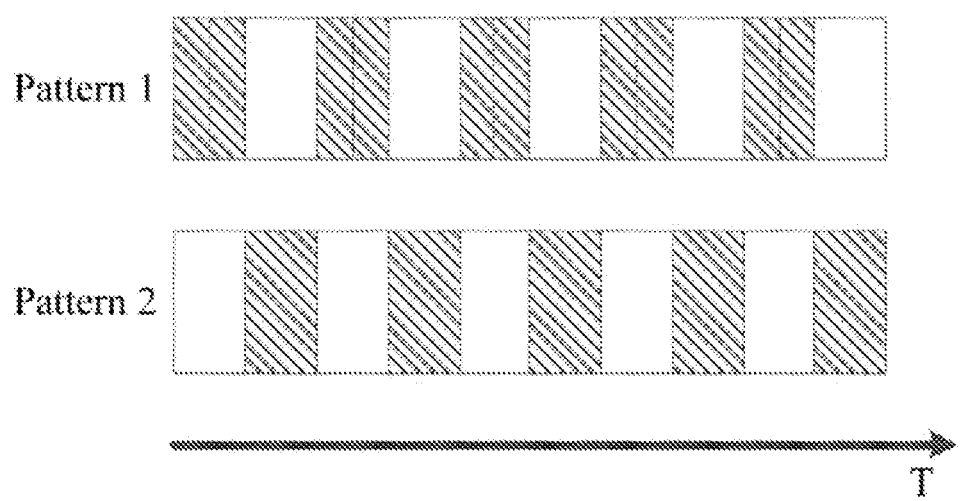
FIG. 5 is a schematic diagram of a time domain resource unit distribution involved in the embodiment shown in FIG. 4.

For example, please refer to FIG. 5, which is a schematic diagram of a time domain resource unit distribution involved in an embodiment of the present disclosure. In FIG. 5, time domain resource units filled with slashes are time domain resource units available for the terminal, and in the group of time domain resource units that is available for the terminal and is indicated by Pattern 1, each two adjacent time domain resource units that are continuous in the time domain constitute one resource unit group, and each two adjacent resource unit groups are not continuous in the time domain; and in the group of time domain resource units that is available for the terminal and is indicated by Pattern 2, each two adjacent time domain resource units are not continuous in the time domain.

In an embodiment, for two different groups of patterns, the time lengths corresponding to single time domain resource units that are available for the terminal and are indicated respectively may be the same or may be different, and even in the same group of Patterns, the time lengths corresponding to two different time domain resource units may be the same or may be different.

For example, in FIG. 5, in the group of time domain resource units that is available for the terminal and is indicated by Pattern 1, each time domain resource unit corresponds to a time length of t/2, and in the group of time domain resource units that is available for the terminal and is indicated by Pattern 2, each time domain resource unit corresponds to a time length of t.

In another possible implementation, the configuration information further includes second time domain resource grouping information in addition to the first:

time domain resource grouping information, where the second time domain resource grouping information indicates a time domain distribution of at least one group of common time domain resource units.

In the embodiments of the present disclosure, the system can also reserve some time domain resource units as common resources, and the common resources are not only allocated to one beam, but can be allocated to different beams in different time domains.

Figure 6:
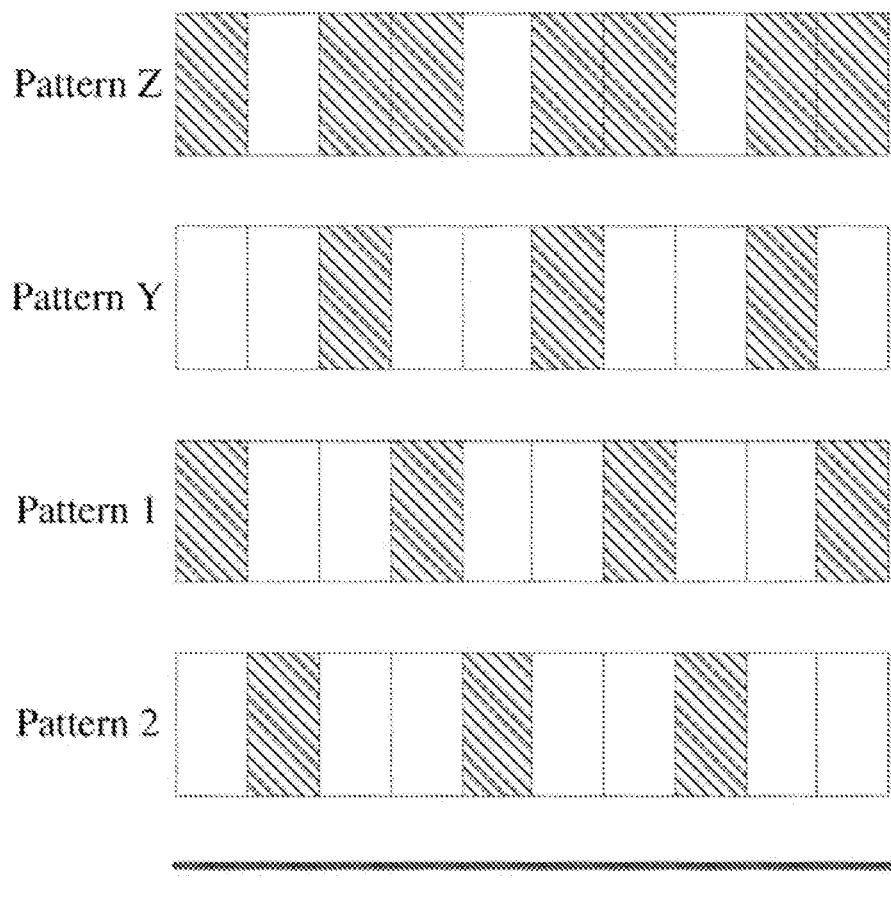
FIG. 6 is a schematic diagram of another time domain resource unit distribution involved in the embodiment shown in FIG. 4.

For example, please refer to FIG. 6, which is a schematic diagram of another time domain resource unit distribution involved in an embodiment of the present disclosure. In FIG. 6, Pattern 1 and Pattern 2 each indicate a time domain distribution of a group of time domain resource units corresponding to an assigned type of signal, and Pattern Y indicates a time domain distribution of a group of common time domain resource units. The time domain resource units that are available tier the terminal and are indicated by the above Pattern 1, Pattern 2, and Pattern Y respectively are different in the time domain.

In an embodiment, the time domain distribution of each group of time domain resource units in the above time domain resource grouping information is a time domain distribution of an uplink time domain resource unit or a downlink time domain resource unit.

Or, the time domain distribution of each group of time domain resource units in the above time domain resource grouping information is a time domain, distribution of an uplink time domain resource unit and a downlink time domain resource unit.

Figure 7:
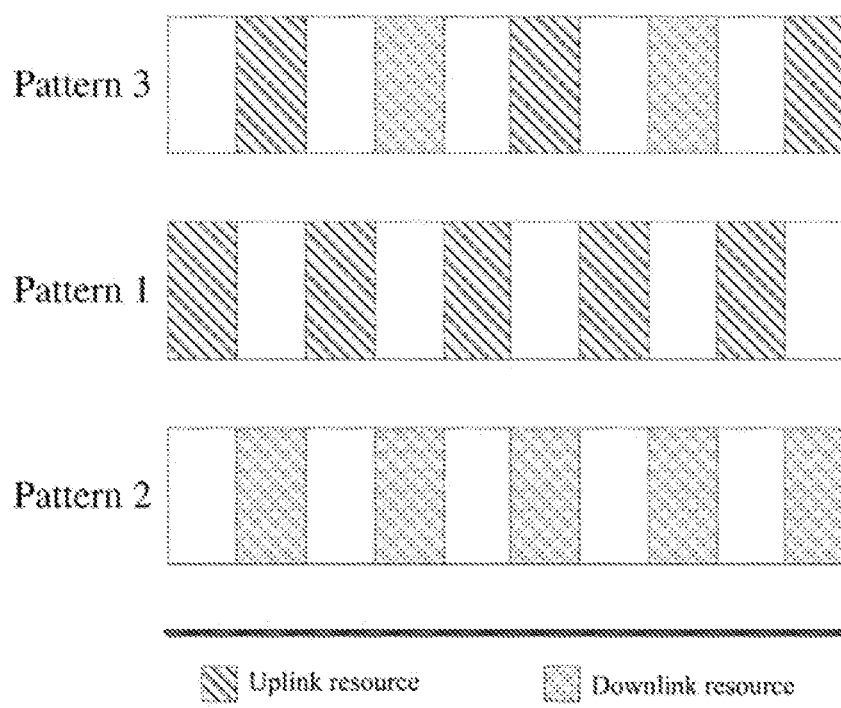
FIG. 7 is a schematic diagram of a time domain resource unit distribution involved in the embodiment shown in FIG. 4.

For example, please refer to FIG. 7, which shows a schematic diagram of a time domain resource unit distribution involved in an embodiment of the present disclosure. In FIG. 7, Pattern 1, Pattern 2, and Pattern 3 each indicates a distribution situation of a group of available time domain resource units in the time domain, where all available time domain resource units indicated by Pattern 1 are uplink resources, all available time domain resource units indicated by Pattern 2 are all downlink resources, and some of the available time domain resource units indicated by the Pattern 3 are uplink resources, and the rest are downlink resources.

In a practical application, in different application scenarios, the manner in which the access network device sends the above configuration information to the terminal is also different. For example, when the above configuration information corresponds to a first type of resource, the access network device sends the configuration information to the terminal through a first control message; where the first type of resource is a resource used for downlink data transmission, a resource used for uplink data transmission, a resource used for feeding back an ACK/NACK message in a hybrid automatic repeat request process, a resource used for transmitting a physical uplink control channel (PUCCH) and a resource used for non-contention access; and the first control message is at least one of a physical broadcast channel (PBCH), system information (SI), radio resource control (RRC) signaling or a media access control element (MAC CE).

Or, when the configuration information corresponds to a resource used for contention access, the access network device sends the configuration information to the terminal through a second control message; where the second control message is at least one of a PBCH or SI.

In an embodiment, when sending the configuration information, the access network device can send all the configuration information through the same signaling, channel, or message; or the access network device can also send different parts in the configuration information to the terminal separately. The signaling, channel or message for sending the different parts may be the same or different.

Step 402: the terminal receives the configuration information sent by the access network device.

Correspondingly, the terminal receives the above configuration information through the message/signaling/channel used when the access network device sends the configuration information.

Step 403: the access network device sends resource indication information to the terminal.

The resource indication information is used for indicating that the terminal determines a time domain resource unit used by the terminal according to the time domain resource grouping information.

In the embodiments of the present disclosure, the resource indication information includes a timing offset, where the timing offset is used for indicating an offset between the time domain resource unit used by the terminal and the current time domain resource unit in the time domain. In some documents or materials, the timing offset may also be referred to as "timing offset". Or the resource indication information does not include a timing offset, where the timing offset is used for indicating an offset between the time domain resource unit used by the terminal and the current time domain resource unit in the time domain.

In an embodiment, when the resource indication information includes the timing offset, the resource indication information indicates that the terminal determines the Nth time domain resource unit after the current time domain unit in the currently used time domain distribution of time domain resource units as the time domain resource unit used by the terminal; where N is the timing offset and N is an integer; when the resource indication information does not include the timing offset, the resource indication information indicates that the terminal determines the Mth time domain resource unit after the current time domain unit in the currently used time domain distribution of time domain resource units as the time domain resource unit used by the terminal, where M is an integer obtained according to presetting and/or a network configuration.

Similar to the case of sending, the configuration information, in the embodiments of the present disclosure, when the access network device sends the resource indication information, the manner in which the access network device sends the resource indication information is different according to different types of the resources indicated by the resource indication information.

For example, when the resource indication information is used for indicating a second type of resource, the access network device sends the resource indication information to the terminal through DCI; where the second type of resource is a resource used for downlink data transmission, a resource used for uplink data transmission, a resource used for feeding back an acknowledgement/negative-acknowledgement message in a hybrid automatic repeat request (HARQ) process, or a resource used for transmitting a physical uplink control channel (PUCCH).

When the resource indication information is used for indicating a resource used for contention access, the access network device sends the resource indication information to the terminal through the PBCH and/or SI.

When the resource indication information is used for indicating a resource used for non-contention access, the access network device sends the resource indication information to the terminal through RRC signaling and/or a MAC CE.

Step 404: the terminal receives the resource indication information sent by the access network device.

Correspondingly, the terminal receives the resource indication information through the message/signaling/channel used when the access network device sends the resource indication information.

Step 405: the terminal determines the time domain resource unit used the terminal according to the time domain resource grouping information.

The above configuration information may include multiple groups of Patterns, and the terminal usually can only use one or more groups at a time. Therefore, before determining the used time domain resource unit according to the time domain resource grouping information, the terminal needs to firstly determine the currently used time distribution of time domain resource units from the time domain distribution of at least one group of time domain resource units indicated by the time domain resource grouping information.

In the embodiments of the present disclosure, the terminal can determine the currently used time domain distribution of time domain resource units in the following three manners.

1) The terminal determines a time domain distribution of one or more groups of assigned time domain resource units corresponding to an assigned type of signal, which is currently detected, as the currently used time domain distribution of time domain resource units.

The above configuration information can include a correspondence between the time domain distribution of the at least one group of assigned time domain resource units indicated by the first time domain resource grouping information and the assigned type of signal.

Or, the access network device may also send, to the terminal, a correspondence between the time domain distribution of the at least one group of assigned time domain resource units indicated by the first time domain resource grouping information and the assigned type of signal.

The configuration information received by the terminal includes a time domain distribution of multiple groups of assigned time domain resource units, that is, it includes multiple groups of Patterns corresponding to different SS blocks. When determining the currently used time domain distribution of time domain resource units, the terminal can detect the SS block that is currently received and satisfies a certain condition (such as the signal quality being higher than a certain threshold), and determine the Pattern corresponding to the detected SS block as the currently used Pattern.

It should be noted that one terminal may be covered by multiple beams. Therefore, the terminal may detect multiple SS blocks at the same time, in this case, the terminal may determine the Pattern corresponding to the SS block on the beam used for the current communication as the currently used Pattern.

In an embodiment, one SS block may correspond to only one group of Patterns, or one SS block may also correspond to two or mere group of Patterns. For example, one SS block can correspond to one group of Patterns, and the group of Patterns indicates the time domain distribution of uplink resources and downlink resources simultaneously; or one SS block can also correspond to two groups of Patterns, where a group of Patterns indicates the time domain distribution of uplink resources, and another group of Patterns indicates the time domain distribution of downlink resources.

2) The terminal receives an activation indication sent by the access network device, and determines, according to the activation indication, a time domain distribution of one or more groups of assigned time domain resource units in the first time domain resource grouping information as the currently used time domain distribution of time domain resource units.

The access network device can send an activation indication to the terminal, and the activation indication is used for indicating that the terminal determines, according to the time domain distribution of a group of assigned time domain resource units in the first time domain resource grouping information, the time domain resource unit used by the terminal.

For example, the access network device determines, according to the beam currently used for communication with the terminal, that the terminal needs to activate which group of Patterns, and then sends an activation indication to the terminal. Where the activation indication can include the identifier of the group of Patterns to indicate that the terminal activates the group of Patterns corresponding to the identifier.

Where the identifier may be information such as the number of the Pattern, or may be an SS block corresponding to the Pattern.

In an embodiment, the access network device sends the activation indication to the terminal through a third control message, where the third control message includes at least one of RRC signaling, a MAC CE, or downlink control information (DCI).

3) The terminal receives a grouping selection indication sent by the access network device, and determines, according to the grouping selection indication, a time domain distribution of one or more groups of assigned time domain resource units in the first time domain resource grouping information, or the time domain distribution of the at least one group of common time domain resource units, or a combination of a time domain distribution of one or more groups of assigned time domain resource units in the first time domain resource grouping information and the time domain distribution of the at least one group of common time domain resource units, as the currently used time domain distribution of time domain resource units.

In the embodiments of the present disclosure, the access network device can send a grouping selection indication to the terminal: where the grouping selection indication is used for indicating that the terminal determines the time domain resource unit used by the terminal according to the time domain distribution of a group of assigned time domain resource units in the first time domain resource grouping information and/or according to the second time domain resource grouping information.

In the embodiments of the present disclosure, when the configuration information includes both the above first time domain resource grouping information and the second time domain resource grouping information, the access network device may further instruct the terminal to use only one of the first time domain resource grouping information and the second time domain resource grouping information, or instruct the terminal to simultaneously use the first time domain resource grouping information and the second time domain resource grouping information.

The case where the terminal uses the first time domain resource grouping information is similar to that in the above 1) and 2), that is, the terminal determines one or more groups of Patterns in the first time domain resource grouping information according to the SS block of the beam used for the current communication, or the terminal determines one or more groups of Patterns in the first time domain resource grouping information according to the activation indication of the access network device.

When the terminal uses the second time domain resource grouping information, since the at least one group of Patterns indicated by the second time domain resource grouping information does not correspond to a specific beam, the terminal can determine all the Patterns indicated by the second time domain resource grouping information as the currently used Patterns.

If the terminal uses the first time domain resource grouping information and the second time domain resource grouping information at the same time, the terminal may combine the determined one or more groups of Patterns corresponding to the first time domain resource grouping information with the Patterns indicated by the second time domain resource grouping information.

For example, as shown in FIG. 6, it is assumed that the Pattern indicated by the second time domain resource grouping information is Pattern Y, and a determined group of Patterns corresponding to the first time domain resource grouping information is Pattern X (for example, Pattern X can be Pattern 1). Then the terminal combines Pattern X with Pattern Y to obtain the currently used Pattern Z.

In an embodiment, when combining one or more groups of Patterns in the first time domain resource grouping information with the Pattern indicated by the second time domain resource grouping information, if each group of Patterns only corresponds to uplink resources or downlink resources, the terminal combines the Patterns corresponding to the uplink resources in the one or more groups of Patterns in the first time domain resource grouping information and in the Pattern indicated by the second time domain resource grouping information, and combines the Patterns corresponding to the downlink resources, so as to obtain two groups of Patterns corresponding to the uplink and downlink resources, respectively. If each group of Patterns corresponds to both the uplink resources and the downlink resources, the terminal combines the one or more groups of Patterns in the first time domain resource grouping information with the Pattern indicated by the second time domain resource grouping information into one group of Patterns.

In an embodiment of the present disclosure, the access network device may send the grouping selection indication to the terminal through DCI.

In an embodiment, when the resource indication information includes a timing offset, the terminal determines the Nth time domain resource unit after the current time domain unit in the currently used time domain distribution of time domain resource units as the tune domain resource unit used by the terminal; where N is the timing offset, and N is an integer.

After determining the currently used time domain distribution of time domain resource units (i.e., the currently used Pattern), the terminal can determine the used time domain resource unit according to the above timing offset and the currently used time domain distribution of time domain resource units.

Considering that the access network device may indicate to the terminal other time domain resource units except the time domain resource unit that is available for the terminal by default, in the embodiments of the present disclosure, the currently used time domain distribution of time domain resource units not only includes a time domain distribution of the time domain resource unit that is available for the terminal by default, but also includes a time domain distribution of other time domain resource units except the time domain resource unit that is available for the terminal by default. The above timing offset may be an absolute timing indication, that is, the above timing offset indicates the Nth time domain resource unit after the current time domain resource unit (which may be the time domain resource unit where the resource indication information is located), the Nth time domain resource unit including the time domain resource unit that is available for the terminal by default and other time domain resource units except the time domain resource unit that is available for the terminal by default.

Or, in another possible implementation, the terminal may also determine the Nth available time domain resource unit after the current time domain resource unit in the currently used time domain distribution of time domain resource units as the time domain resource unit used by the terminal.

In the embodiments of the present disclosure, the above timing offset may also be a relative timing indication in the time domain resource units that are available for the terminal by default, that is, the above timing offset indicates the Nth time domain resource unit in the time domain resource units that are available for the terminal by default after the current time domain resource unit (which may be the time domain resource unit where the resource indication information is located).

The difference between the above absolute timing indication and the relative timing indication in the default available time domain resource units lies in that the relative timing indication indicates fewer bits, and the disadvantage is that only internal default available resources of the Pattern can be indicated; the absolute timing indication indicates more bits, but can flexibly allocate time domain resources among different beams dynamically.

In an embodiment, when the time domain resource unit used by the terminal is an uplink time domain resource unit, the terminal determines the Nth uplink time domain resource unit after the current time domain unit in the currently used time domain distribution of time domain resource units as the time domain resource unit used by the terminal; when the time domain resource unit used in the terminal is a downlink time domain resource unit, the terminal determines the Nth downlink time domain resource unit after the current time domain unit in the currently used time domain distribution of time domain resource units as the time domain resource unit used by the terminal.

In the embodiments of the present disclosure, if the uplink resource time domain distribution and the downlink resource time domain distribution in the currently used time domain distribution of time domain resource units that is determined by the terminal are divided into two different Patterns, as for the two Patterns, the terminal can determine the Nth time domain resource unit alter the current time domain resource unit in the Pattern corresponding to the uplink resources as the time domain resource unit used by the terminal, when the time domain resource unit that the terminal needs to determine is an uplink time domain resource unit; otherwise, as for the two Patterns, the terminal can determine the Nth time domain resource unit after the current time domain resource unit in the Pattern corresponding to the downlink resources as the time domain resource unit used by the terminal, when the time domain resource unit that the terminal needs to determine is an downlink time domain resource unit.

If the uplink resource time domain distribution and the downlink resource time domain distribution in the currently used time domain distribution of time domain resource units that is determined by the terminal are the same Pattern, when the time domain resource unit determined by the terminal is the uplink time domain resource unit, the terminal may determine the Nth uplink time domain resource unit after the current time domain resource unit in the Pattern as the time domain resource unit used by the terminal; otherwise, when the time domain resource unit determined by the terminal is the downlink time domain resource unit, the terminal may determine the Nth uplink time domain resource unit after the current time domain resource unit in the Pattern as the time domain resource unit used by the terminal.

In an embodiment, when the resource indication information does not include a timing offset, the terminal determines the Mth time domain resource unit after the current time domain resource unit in the currently used time domain distribution of time domain resource units as the time domain resource unit used by the terminal, where M is an integer obtained according to presetting and/or a network configuration.

In order to reduce the communication resources occupied by the signaling transmission, in the embodiments of the present disclosure, when indicating the time domain resource unit at a specific location after the current time domain resource unit, the access network device may not carry the timing offset in the resource indication information. And when receiving the resource indication information that does not carry the timing offset, the terminal can determine the time domain resource unit at the specific location as the time domain resource unit used by the terminal.

Where the specific value of the above M may be a preset value, may also be determined according to a network configuration, or may be determined by combining a preset value and a network configuration.

For example, if the M is a preset value, such as 1, when indicating that the time domain resource unit used by the terminal is the first time domain resource unit after the current time domain resource unit, the access network device sends the resource indication information that does not carry the timing offset to the terminal. After receiving the resource indication information the terminal parses and determines that the timing offset is not included, and then determines the first time domain resource unit after the current time domain resource unit as the used time domain resource unit.

For example, a network may send a configuration related to the resource indication information that does not carry the timing offset to the terminal in advance, so as to configure the specific value of the M, and the value of the M configured in different time periods or in different scenarios may be different. After the terminal receives the resource indication information, if it is determined by parsing that the timing offset is not included, then the terminal determines the filth time domain resource unit after the current time domain resource unit as the used time domain resource unit according to the value M configured by the network.

Or, the M can also be determined by combing a preset value and a network configuration, for example, the value related to M that is preset in the terminal is 1, and the network sends the configuration related to the resource indication information that does not carry the timing offset to the terminal in advance, so as to configure the resource type indicated by the resource indication information that does not carry the timing offset, for example, configuring the resource type indicated by the resource indication information that does not carry the timing offset to be an uplink resource. After receiving the resource indication information, if the terminal parses and determines that the timing offset is not included, then the terminal determines the first uplink time domain resource unit after the current time domain resource unit as the used time domain resource unit.

Step 406: the terminal sends and receives data on the determined time domain resource unit.

In a specific implementation of the embodiment shown in FIG. 4, taking the application scenario shown in FIG. 2 an example, the UE receives a system message of the network, obtains Pattern 1 and Pattern 2 as shown in FIG. 5, and learns from the system message of the network that Pattern 1 corresponds to SS block 1 and Pattern 2 corresponds to SS block 2. Pattern 1 is the currently used Pattern determined by the terminal.

Figure 8:
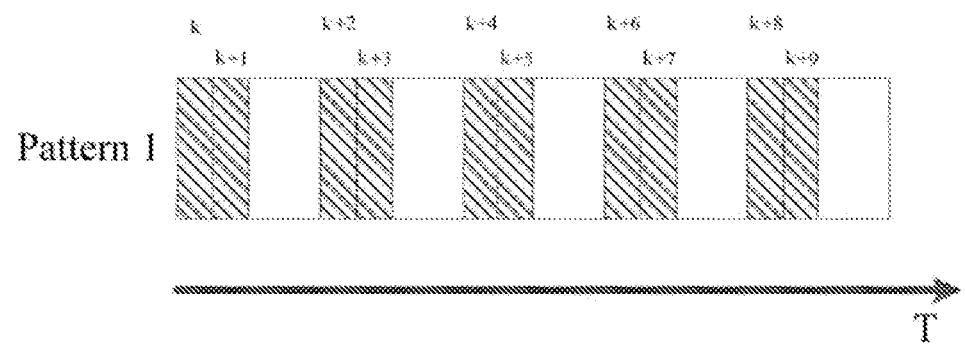
FIG. 8 is a schematic diagram of resource numbering involved in the embodiment shown in FIG. 4.

Please refer to FIG. 8, which shows a schematic diagram of resource numbering involved in art embodiment of the present disclosure. It is assumed that the scheduling granularity and the numbering for the resources that are available in Pattern 1 by default are shown in FIG. 8. If the UE receives a DCI indication at time k+4, and the timing offset for the next transmission (the offset with respect to the time domain resource unit of the currently received DCI) is 1, then the UE performs data transmission on the time domain resource unit corresponding to time k+5 in FIG. 8. If the UE receives the DCI indication at time k+4, and the timing offset for the next transmission is 2, then the LIE performs data transmission on the time domain resource unit corresponding to time k+6 in FIG. 8.

Figure 9:
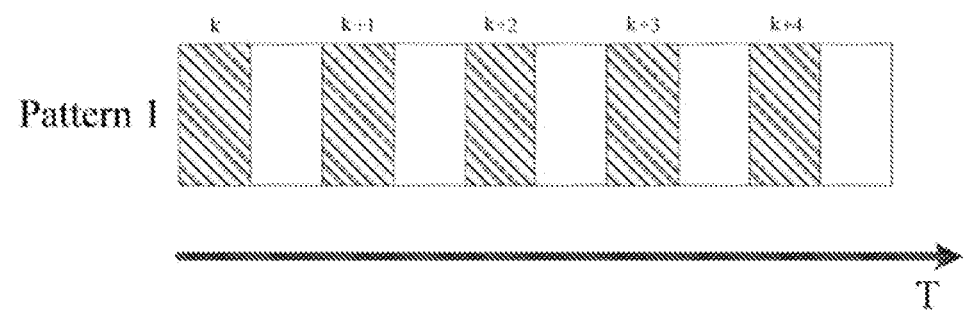
FIG. 9 is a schematic diagram of resource numbering involved, in the embodiment shown in FIG. 4.

Or, please refer to FIG. 9, which shows a schematic diagram of resource numbering involved in an embodiment of the present disclosure. It is assumed that the scheduling granularity and the numbering for the resources that are available in Pattern 1 by default are shown in FIG. 9. If the UE receives a DCI indication at time k+2, and the timing offset for the next transmission is 1, then the UE performs data transmission on the time domain resource unit corresponding to time k+3 in FIG. 9; and if the UE receives the DCI indication at time k+2, and the timing offset for the next transmission is 2, the UE performs data transmission on the time domain resource unit corresponding to time k+4 in FIG. 9.

Figure 10:
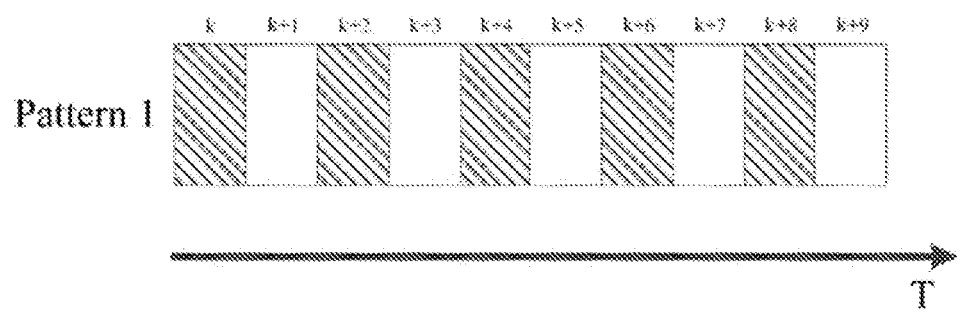
FIG. 10 is a schematic diagram of resource numbering involved in the embodiment shown in FIG. 4.

Or, please refer to FIG. 10, which shows a schematic diagram of resource numbering involved in an embodiment of the present disclosure. It is assumed that the scheduling granularity and the numbering for the resources that are available in Pattern 1 by default are shown in FIG. 10. If the UE receives a DCI indication at time k+4, and the timing offset for the next transmission is 1, then the UE performs data transmission on the time domain resource unit corresponding to time k+6 in FIG. 10; and if the UE receives the DCI indication at time k+4, and the timing offset for the next transmission is 2, then the UE performs data transmission on the time domain resource unit corresponding, to time k+8 in FIG. 10.

Or, it is assumed that the scheduling granularity and the numbering for the resources that are available in Pattern 1 by default are shown in FIG. 10. If the UE receives a DCI indication at time k+4, and the timing offset for the next transmission is 2, then the UE performs data transmission on the time domain resource unit corresponding to time k+6 in FIG. 10; if the UE receives the DCI indication at time k+4, and the timing offset for the next transmission is 4, then the UE performs data transmission on the time domain resource unit corresponding to time k+8 in FIG. 10; and if the UE receives the DCI indication at time k+4, and the timing offset for the next transmission is 1, then the UE performs data transmission on the time domain resource unit corresponding to the time k+5 in FIG. 10.

In summary, in the solution shown in the embodiments of the present disclosure, an access network device sends configuration information to a terminal where configuration information includes time domain resource grouping information for indicating a time domain distribution of at least one group of time domain resource units; and the access network device sends resource indication information to the terminal, and the terminal determines a time domain resource unit used by the terminal according to the resource indication information and the time domain resource grouping information, thus resources that are discontinuous in the time domain can be flexibly indicated, thereby achieving the effect of indicating resources that are discontinuous in the time domain.

The following are apparatus embodiments in the embodiments of the present disclosure. For the parts that are not elaborated in the apparatus embodiments, reference may be made to the technical details disclosed in the above method embodiments.

Figure 11:
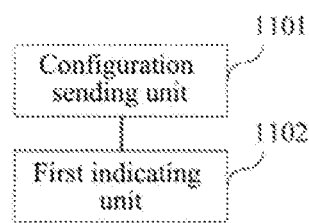
FIG. 11 is a structural block diagram of a resource indicating apparatus according to an embodiment of the present disclosure.

Please refer to FIG. 11, which shows a schematic structural diagram of a resource indicating apparatus according to an embodiment of the present disclosure. The resource indicating apparatus can be implemented as all or part of an access network device bye software, hardware, and a combination of both. The resource indicating apparatus includes: a configuration sending unit 1101 and a first indicating unit 1102;

where the configuration sending unit 1101 is configured to perform the step related to sending the configuration information performed by the access network device in the embodiment shown in FIG. 4; and the first indicating unit 1102 is configured to perform the step related to sending the resource indication information performed by the access network device in the embodiment shown in FIG. 4.

In an embodiment, the resource indicating apparatus may further include: a correspondence sending unit, a second indicating unit, and a third indicating unit;

where the correspondence sending unit is configured to perform the step related to sending the corresponding performed by the access network device in the embodiment shown in FIG. 4;

the second indicating unit is configured to perform the step related to sending the activation indication performed by the access network device in the embodiment shown in FIG. 4; and the third indicating, unit is configured to perform the step related to sending the grouping selection indication performed by the access network device in the embodiment shown in FIG. 4.

Figure 12:
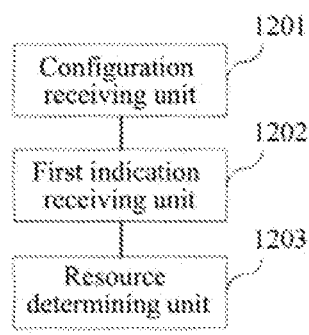
FIG. 12 is a structural block diagram of a resource indicating apparatus according to an embodiment of the present disclosure.

Please refer to FIG. 12, which shows a schematic structural diagram of a resource indicating apparatus according to an embodiment of the present disclosure. The resource indicating apparatus can be implemented as all or part of a terminal by software, hardware, and a combination of both. The resource indicating apparatus includes a configuration receiving unit 1201, a first indication receiving unit 1202, and a resource determining unit 1203;

where the configuration receiving unit 1201 is configured to perform the step related to receiving the configuration information performed by the terminal in the embodiment shown in FIG. 4;

the first indication receiving unit 1202 is configured to perform the step related to receiving the resource indication information performed by the terminal in the embodiment shown in FIG. 4; and the resource determining unit 1203 is configured to perform the step related to determining the time domain resource unit performed by the terminal in the embodiment shown in FIG. 4.

In an embodiment, the resource indicating apparatus may further include: a correspondence receiving unit, a first time domain distribution determining unit, a second indication receiving unit, a second time domain distribution determining unit, a third indication receiving unit, and a third time domain distribution determining unit;

where the correspondence receiving unit is configured to perform the step related to receiving the correspondence performed by the terminal in the embodiment shown in FIG. 4;

the first time domain distribution determining unit is configured to perform the step related to determining the currently used time domain distribution according to the correspondence performed by the terminal in the embodiment shown in FIG. 4;

the second indication receiving unit is configured to perform the step related to receiving the activation indication performed by the terminal in the embodiment shown in FIG. 4;

the second time domain distribution determining unit is configured to perform the step related to determining the currently used time domain distribution according to the activation indication performed by the terminal in the embodiment shown in FIG. 4;

the third indication receiving unit is configured to perform the step related to receiving the grouping selection indication performed by the terminal in the embodiment shown in FIG. 4; and the third time domain distribution determining unit is configured to perform the step related to determining the currently used time domain distribution according to the grouping selection indication performed by the terminal in the embodiment shown in FIG. 4.

Figure 13:
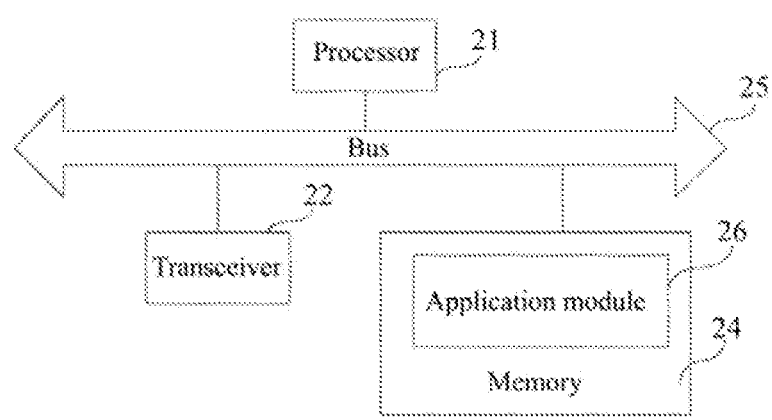
FIG. 13 is a structural block diagram of a communication device according to an embodiment of the present disclosure.

Please refer to FIG. 13, which shows a schematic structural diagram of a communication device according to an exemplary embodiment of the present disclosure. The communication device may be implemented as an access network device or a terminal in the system shown in FIG. 1.

The communication device includes: a processor 21, a transceiver 22, a memory 24, and a bus 25.

The processor 21 includes one or more processing cores, and the processor 21 executes various functional applications and information processing by running software programs and modules.

The transceiver 22 can be implemented as a communication component, and the communication component can be a communication chip. The communication chip can include a receiving module, a transmitting module, a modem module, etc., for modulating and/or demodulating information, and receiving, or sending the information via a wireless signal.

The memory 24 is connected to the processor 21 via the bus 25.

The memory 24 can be configured to store software programs and modules.

The memory 24 can store an application module 26 described by at least one function.

When the communication device can be implemented as an access network device in the system shown in FIG. 1, the application module 26 can include: a configuration sending module and a first indicating module. In an embodiment, the application module 26 can further include: a correspondence sending module, a second indicating module, and a third indicating module.

The processor 21 is configured to execute the configuration sending module to implement the above step related to sending the configuration information; the processor 21 is configured to execute the first indicating module to implement the above step related to sending the resource indication information; the processor 21 is configured to execute the correspondence sending module to implement the above step related to sending the correspondence; the processor 21 is configured to execute the second indicating module to implement the step related to sending the activation indication; and the processor 21 is configured to execute the third indicating module to implement the step related to sending the grouping selection indication.

When the communication device can be implemented as a terminal in the system shown in FIG. 1, the application module 26 can include: a configuration receiving module, a first indication receiving module, and a resource determining module; In an embodiment, the application module 26 can further include: a correspondence receiving module, a first time domain distribution determining module, a second indication receiving module, a second time domain distribution determining module, a third indication receiving module, and a third time domain distribution determining module.

The processor 21 is configured to execute the configuration receiving module to implement the above step related to receiving, the configuration information; the processor 21 is configured to execute the first indication receiving module to implement the above step related to receiving the resource indication information; the processor 21 is configured to execute the resource determining module to implement the above step related to determining the time domain resource unit; the processor 21 is configured to execute the correspondence receiving module to implement the above step related to receiving the correspondence; the processor 21 is configured to execute the first time domain distribution determining module to implement the above step related to determining the currently used time domain distribution according to the correspondence; the processor 21 is configured to execute the second indication receiving module to implement the above step related to receiving the activation indication; the processor 21 is configured to execute the second time domain distribution determining module to implement the above step related to determining the currently used time domain distribution according to the activation indication; the processor 21 is configured to execute a third indication receiving module to implement the above step related to receiving the grouping selection indication; and the processor 21 is configured to execute the third time domain distribution determining module to implement the above step related to determining the currently used time domain distribution according to the grouping selection indication.

Moreover, the memory 24 can be implemented by any type of volatile or non-volatile memory device, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

Those skilled in the art should appreciate that in one or more of the above examples, the functions described in the embodiments of the present disclosure may be implemented in hardware, software, firmware, or any combination thereof. When implemented in software, the functions may be stored in a computer readable medium or transmitted as one or more instructions or codes an a computer readable medium. The computer readable medium includes a computer storage medium and a communication medium, where the communication medium includes any media that facilitates transferring a computer program from one place to another. A storage medium may be any available medium that can be accessed by a general purpose or special purpose computer.

The above are only the preferred embodiments of the present disclosure, and are not intended to limit the present disclosure. Any modifications, equivalents, improvements, etc., which are within the spirit and principle of the present disclosure, should be included within the protection scope of the present disclosure.

What is claimed is:

1. A resource indicating method, comprising:
sending, by an access network device, configuration information and grouping selection indication information to a terminal, wherein the configuration information comprises time domain resource grouping information indicating a time domain distribution of at least one group of time domain resource units; and
sending, by the access network device, resource indication information to the terminal, wherein the resource indication information indicates that the terminal determines one or more time domain resource units used by the terminal according to the time domain resource grouping information and the grouping selection indication information,
so that the terminal determines one or more time domain resource units according to the time domain resource grouping information and the grouping selection indication information.

2. The method according to claim 1, wherein,
the configuration information comprises first time domain resource grouping information indicating a time domain distribution of at least one group of assigned time domain resource units, and each group of the assigned time domain resource units is associated with one assigned type of signal, or
the configuration information comprises first time domain resource grouping information and second time domain resource grouping information; wherein the first time domain resource grouping information indicates a time domain distribution of at least one group of assigned time domain resource units, and each group of the assigned time domain resource units corresponds to one assigned type of signal; and the second time domain resource grouping information indicates a time domain distribution of at least one group of common time domain resource units.

3. The method according to claim 2, wherein,
the configuration information further comprises a correspondence between the time domain distribution of the at least one group of assigned time domain resource units and the assigned type of signal.

4. The method according to claim 3, wherein,
the assigned type of signal is or part of signals in a synchronization signal block (SS block).

5. The method according to claim 2, further comprising:
sending a correspondence between the time domain distribution of the at least one group of assigned time domain resource units and the assigned type of signal to the terminal.

6. The method according to claim 5, wherein,
the assigned type of signal is all or part of signals in a synchronization signal block (SS block).

7. The method according to claim 2, further comprising:
sending an activation indication to the terminal, wherein the activation indication indicates that the terminal determines the time domain resource unit used by the terminal according to a time domain distribution of a group of assigned time domain resource units in the first time domain resource grouping information.

8. The method according to claim 2,
wherein the grouping selection indication information indicates that the terminal determines the time domain resource unit used by the terminal according to at least one of the following: a time domain distribution of a group of assigned time domain resource units in the first time domain resource grouping information, and the second time domain resource grouping information.

9. The method according to claim 1, wherein the sending, ley the access network device, configuration information and grouping selection indication information to a terminal comprises:
sending the configuration information to the terminal through a first control message when the configuration information corresponds to a first type of resource;
wherein the first type of resource is a resource for downlink data transmission, a resource for uplink data transmission, a resource for feeding back an acknowledgement/negative-acknowledgment message in a hybrid automatic repeat request (HARQ) process, a resource for transmitting a physical uplink control channel (PUCCH), and a resource for non-contention access; and
the first control message is at least one of a physical broadcast channel (PBCH), system information (SI), radio resource control (RRC) signaling, or a media access control element (MAC CE).

10. The method according to claim 1, wherein the sending, by the access network device, configuration information and grouping selection indication information to a terminal comprises:
sending the configuration information to the terminal through a second control message when the configuration information corresponds to a resource for contention access;
wherein the second control message is at least one of a PBCH and SI.

11. The method according to claim 1, wherein the sending, by the access network device, resource indication information to the terminal comprises:
sending the resource indication information to the terminal through DCI when the resource indication information indicates a second type of resource, wherein the second type of resource is a resource for downlink data transmission, a resource for uplink data transmission, a resource for feeding back an acknowledgement/negative-acknowledgment message in an HARQ process, or a resource for transmitting a PUCCH;
sending the resource indication information to the terminal through at least one of a PBCH and SI when the resource indication information indicates a resource for contention access; and
sending the resource indication information to the terminal through at least one of RRC signaling and a MAC CE when the resource indication information indicates a resource for non-contention access.

12. The method according to claim 1, wherein,
the resource indication information comprises a timing offset indicating an offset between the time domain resource unit used by the terminal and a current time domain resource unit in a time domain; or,
the resource indication information does not comprise a timing offset indicating an offset between the time domain resource unit used by the terminal and a current time domain resource unit in a time domain.

13. The method according to claim 12, wherein,
the resource indication information indicates that the terminal determines an Nth time domain resource unit after the current time domain unit in a currently used time domain distribution of time domain resource units as the time domain resource unit used by the terminal, when the resource indication information comprises the timing offset; wherein N is the timing offset, and N is an integer; and
the resource indication information indicates that the terminal determines an Mth time domain resource unit after the current time domain unit in the currently used time domain distribution of time domain resource units as the time domain resource unit used by the terminal, when the resource indication information does not comprise the timing offset; wherein M is at least one of an integer obtained according to presetting, an integer obtained according to a network configuration, and an integer obtained according to presetting and a network configuration;
wherein the currently used time domain distribution of time domain resource units is a time domain distribution of one or more groups of time domain resource units determined by the terminal from the time domain distribution of the at least one group of time domain resource units.

\* \* \* \* \*